April 26, 1966  H. L. FRICK  3,247,838
FUEL BURNER
Filed Feb. 24, 1964  8 Sheets-Sheet 1
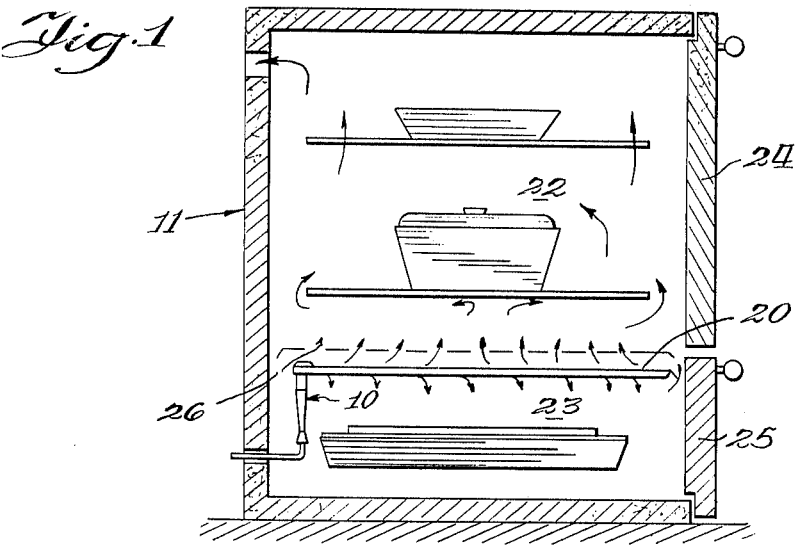
Fig. 1
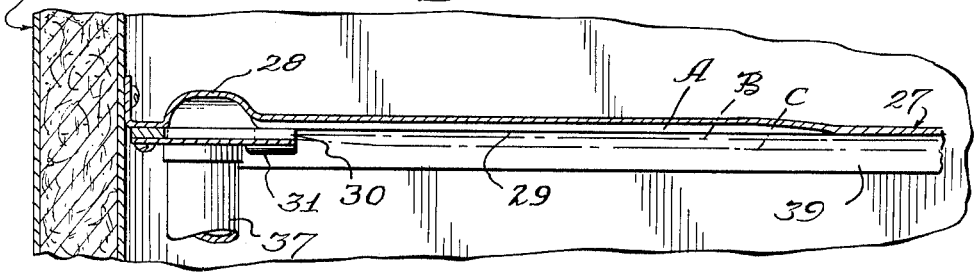
Fig. 5
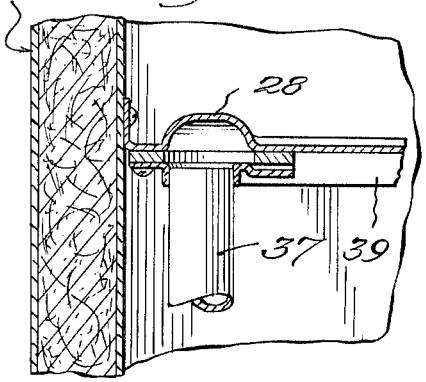
Fig. 6
Fig. 7
Inventor
Harold L. Frick
Burmeister, Hofgren, Wegner, Allen, Stellman & McCord
attorneys

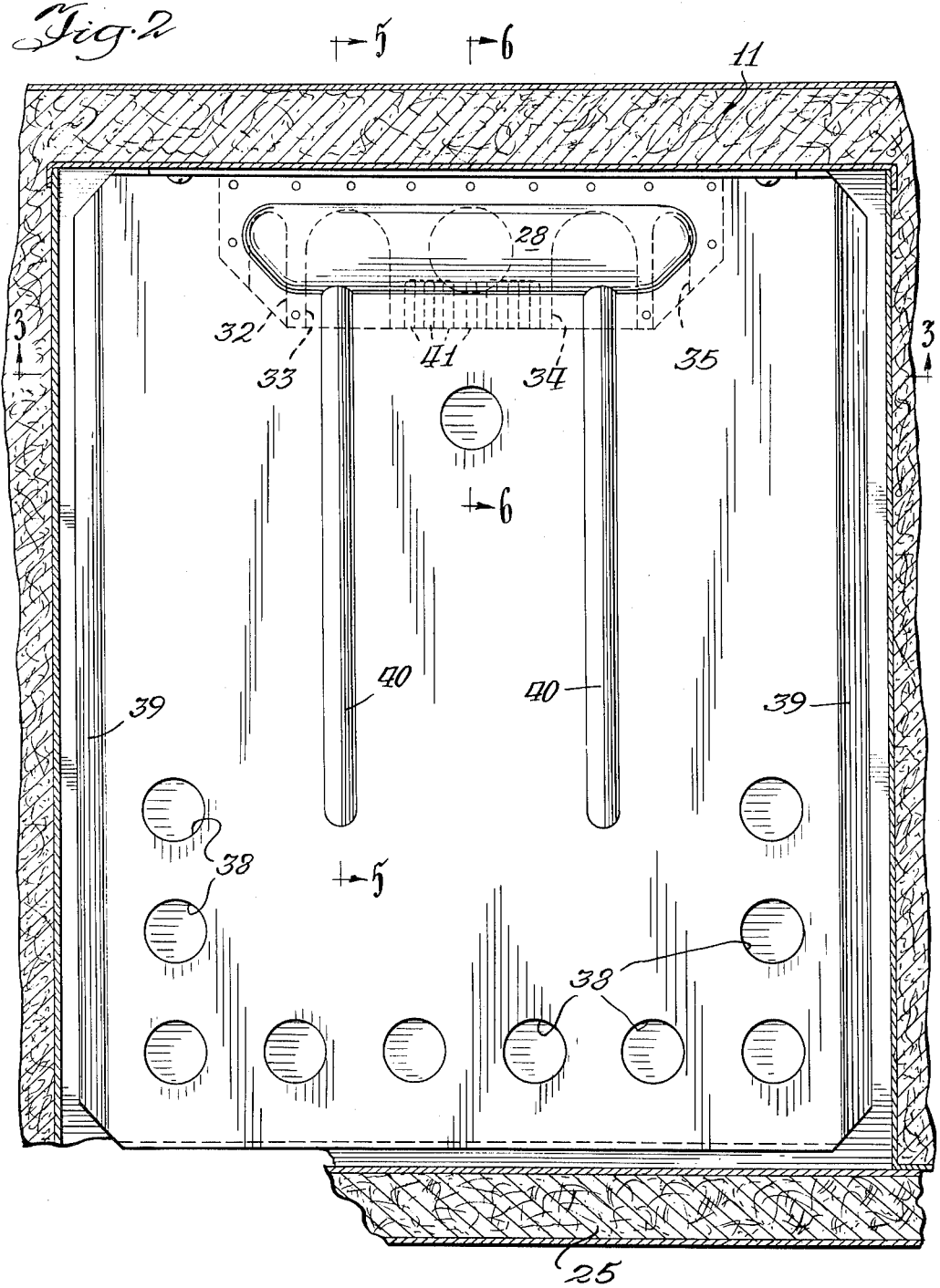

April 26, 1966 H. L. FRICK 3,247,838
FUEL BURNER
Filed Feb. 24, 1964 8 Sheets-Sheet 3
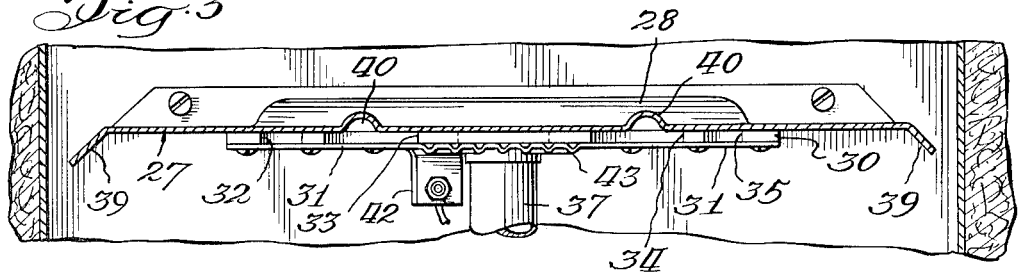
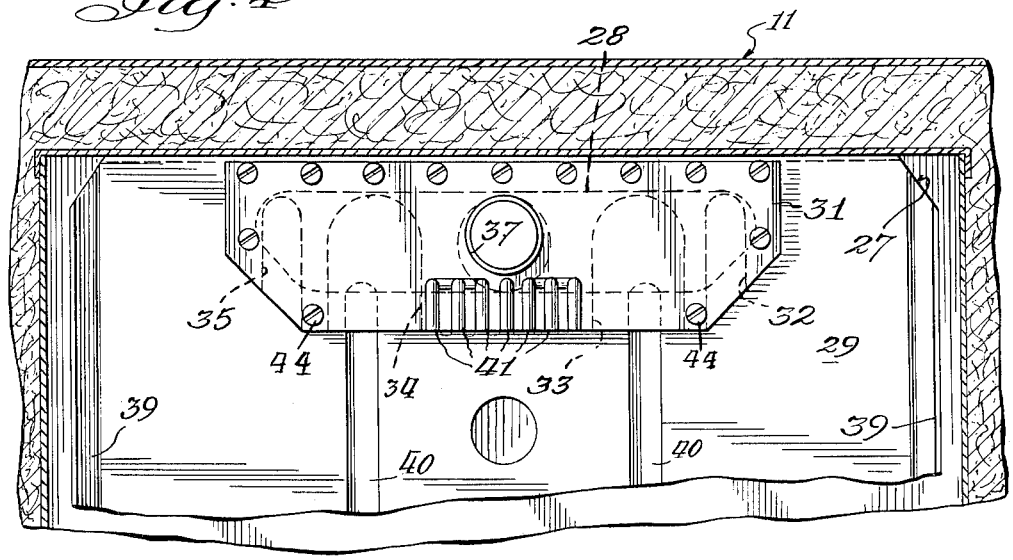
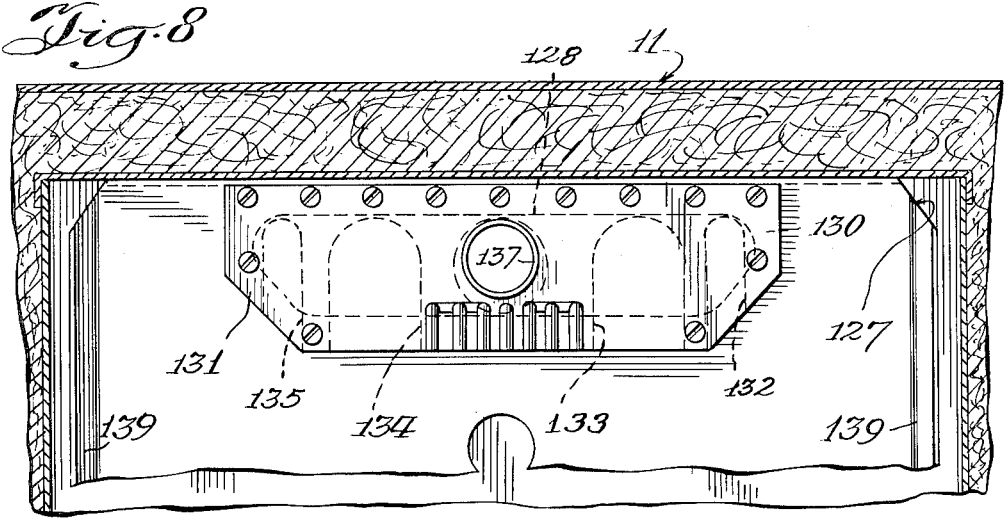

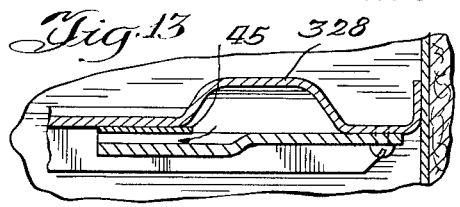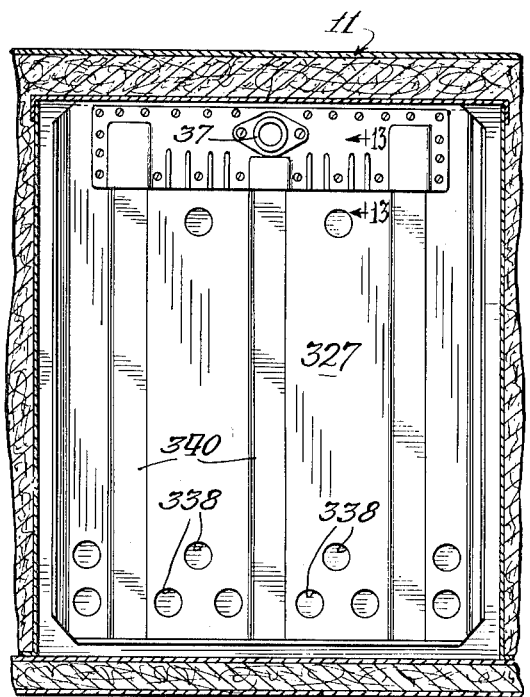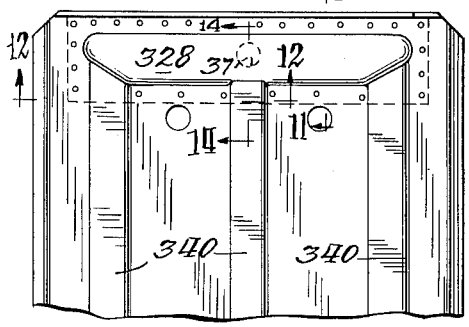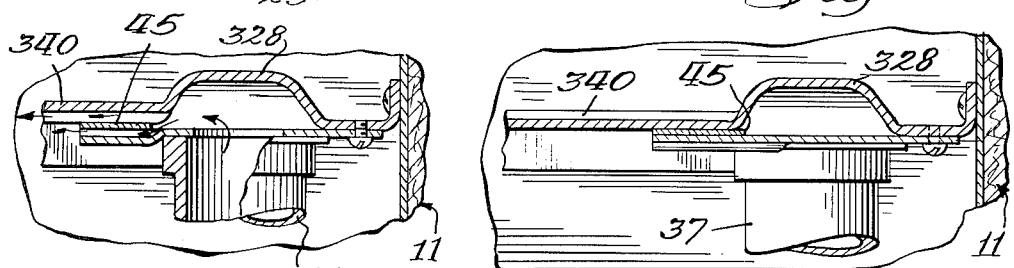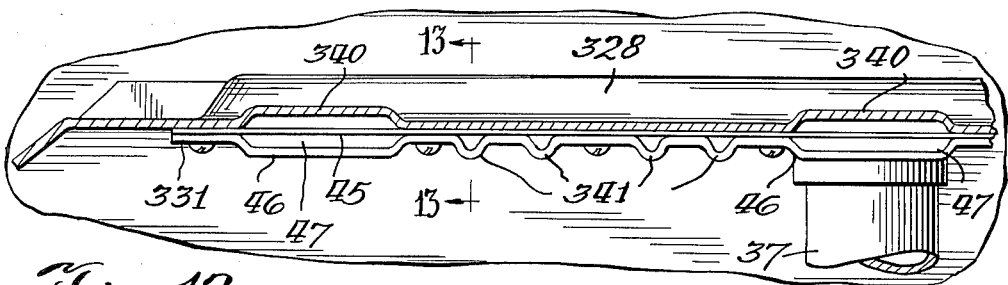

April 26, 1966  H. L. FRICK  3,247,838
FUEL BURNER

Filed Feb. 24, 1964  8 Sheets-Sheet 6

April 26, 1966  H. L. FRICK  3,247,838
FUEL BURNER
Filed Feb. 24, 1964  8 Sheets-Sheet 8
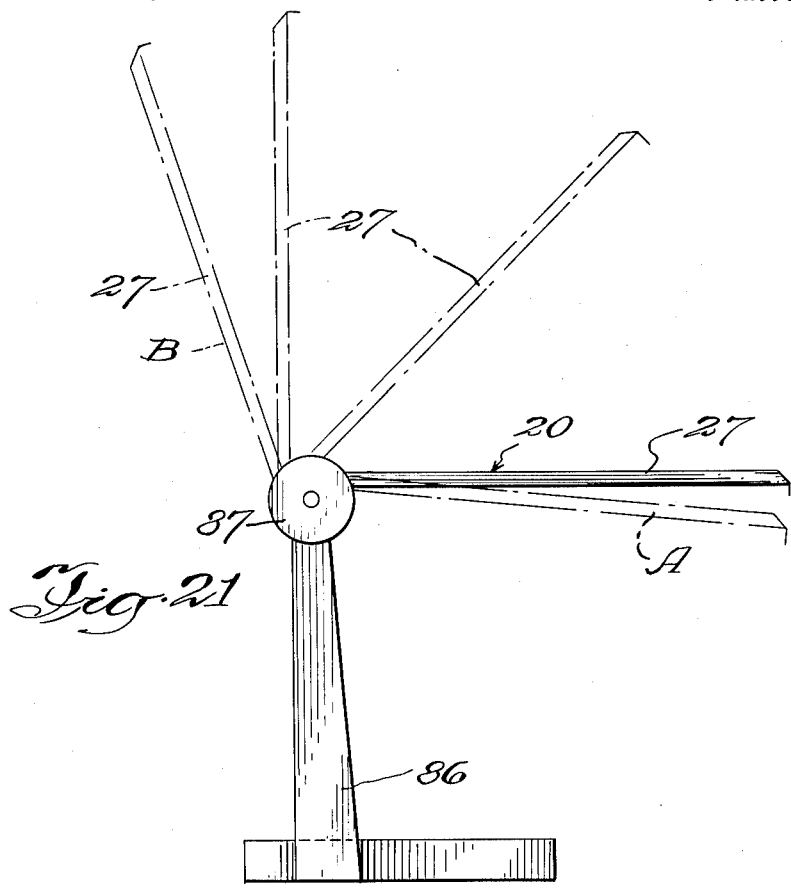
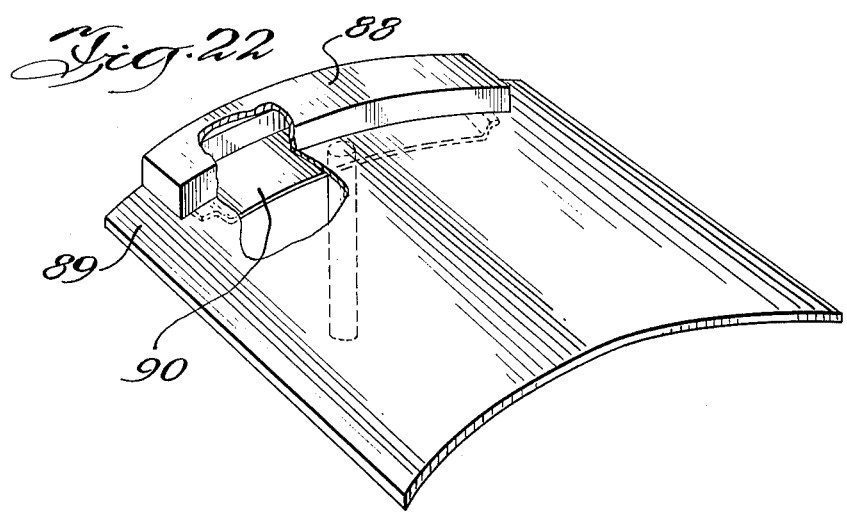

United States Patent Office 3,247,838
Patented Apr. 26, 1966

3,247,838
FUEL BURNER
Harold L. Frick, Marion, Ohio, assignor to Whirlpool Corporation, a corporation of Delaware
Filed Feb. 24, 1964, Ser. No. 346,721
5 Claims. (Cl. 126—41)

This application is a continuation-in-part of application Serial No. 275,362, filed April 24, 1963, now abandoned.

This invention relates to a fuel burner, a cooking unit employing the burner, and a method of generating a radiant flame surface.

Modern conventional gas ovens normally consist of a baking compartment or cavity overlying a broiling compartment for heating both the broiling and baking cavities. Electric ovens normally have only a single cavity in which both baking and broiling may be accomplished. The electric oven is therefore more compact and, in the case of so-called "built-in" ovens, occupies a smaller space than a gas oven having a baking cavity of the same usable volume. Thus, it has heretofore not been possible to interchange gas and electric built-in oven units if a housewife has become dissatisfied with one or the other type unit, and in the case of new construction of homes a builder has been forced either to wait until he could sell a home before installing the type appliance wanted by the purchaser or make costly alterations in order to make a sale.

A major factor dictating the use of dual cavities in gas ovens has been the conventional multiport cast iron burner. It is both bulky and relatively expensive. In order to accomplish both baking and broiling in a single oven cavity it is normally necessary to provide two gas burners, one at the bottom of the cavity for baking and one at the top for broiling. Due to the bulk of multiport cast iron burners it would be necessary to reduce the usable volume of the baking cavity to maintain interchangeability with built-in electric ovens, and of course the cost would be increased.

The gas fuel burner of this invention alleviates these problems. The burner is particularly well suited for use as a broiler burner in a single cavity gas oven and in addition it may be used in a conventional dual cavity gas oven with equal effectiveness as a combination broiling and baking burner.

The fuel burner of this invention projects flame in a thin sheet of substantial length and width so that it provides excellent heat distribution over the space or the article being heated. The burner is economical to construct, as it is made up primarily of simple, readily constructed parts such as sheet metal. Also, the burner can be easily expanded in size by using a plurality of similar spaced burners for heating larger spaces and articles. Furthermore, tests have shown that the burner gives excellent combustion in burning performances.

Although the burner of this invention has been found ideally useful in a gas cooking unit, it can also be used for any other desired type of heating, particularly where the heating is by radiation or convection or both.

An important feature of this invention is to provide a built-in, single cavity gas oven that is interchangeable with and has the same usable baking volume as a built-in electric oven, and having the novel fuel burner as a part thereof.

Another feature of this invention is to provide an improved radiant fuel burner including flame extender means for spreading the flame in a long, wide but relatively thin sheet and the combustion of the gases occurring on the exposed surface of the flowing gas with the combustion being separated from the flame extender means by a layer or lamina of unburned gas and air mixture.

Another feature of the invention is to provide an improved cooking unit having an oven and a broiler thereunder together with a fuel burner of the above improved construction in the broiler together with vent means for conveying heated gases from the burner to heat the oven.

Another feature of the invention is to provide an improved gas fuel burner which cooperates with other similar burners to provide laterally, a substantially uninterrupted sheet of flame for use in a relatively large broiler particularly of the commercial type.

Another feature of this invention is to provide an improved method of burning a gaseous fuel mixture so as to form an essentially flat layer of burning gases for radiant heating.

Another feature of this invention is to provide an electrical control circuit including piloting means for a single cavity, dual burner gas oven.

Another feature of this invention is to provide improved piloting means for the burner of this invention.

Other features and advantages of the invention will be apparent from the following description of several embodiments thereof taken in conjunction with the accompanying drawings. Of the drawings:

FIGURE 1 is a semi-diagrammatic vertical sectional view through a cooking unit, here a gas stove, utilizing the burner of this invention.

FIGURE 2 is a plan view of the burner of FIGURE 1.

FIGURE 3 is a vertical sectional view taken along the line 3—3 of FIGURE 2.

FIGURE 4 is a fragmentary bottom view of the burner of FIGURE 2 looking up toward the bottom surface of the burner.

FIGURE 5 is a vertical sectional view taken substantially along line 5—5 of FIGURE 2.

FIGURE 6 is a vertical sectional view taken substantially along line 6—6 of FIGURE 2.

FIGURE 7 is a perspective view of the burner of FIGURES 1–6.

FIGURE 8 is a view similar to FIGURE 4 but showing a second embodiment of the burner.

FIGURE 9 is a bottom view of a third embodiment of the burner of this invention.

FIGURE 10 is a fragmentary plan view of the burner of FIGURE 9.

FIGURE 11 is a sectional view taken substantially along line 11—11 of FIGURE 10.

FIGURE 12 is a sectional view taken substantially along line 12—12 of FIGURE 10.

FIGURE 13 is a vertical sectional view taken substantially along line 13—13 of FIGURE 9.

FIGURE 14 is a vertical sectional view taken substantially along line 14—14 of FIGURE 10.

FIGURE 20 is an across the line diagram illustrating the electrical circuit for a single cavity gas oven having separate broiler and oven valve gas supplies of the type illustrated in FIGURE 15.

FIGURE 21 is a side elevational view of a test apparatus illustrating the burner of this invention operating in various angular positions.

FIGURE 22 is a perspective view illustrating a fifth embodiment of the burner of this invention.

Figure 19:
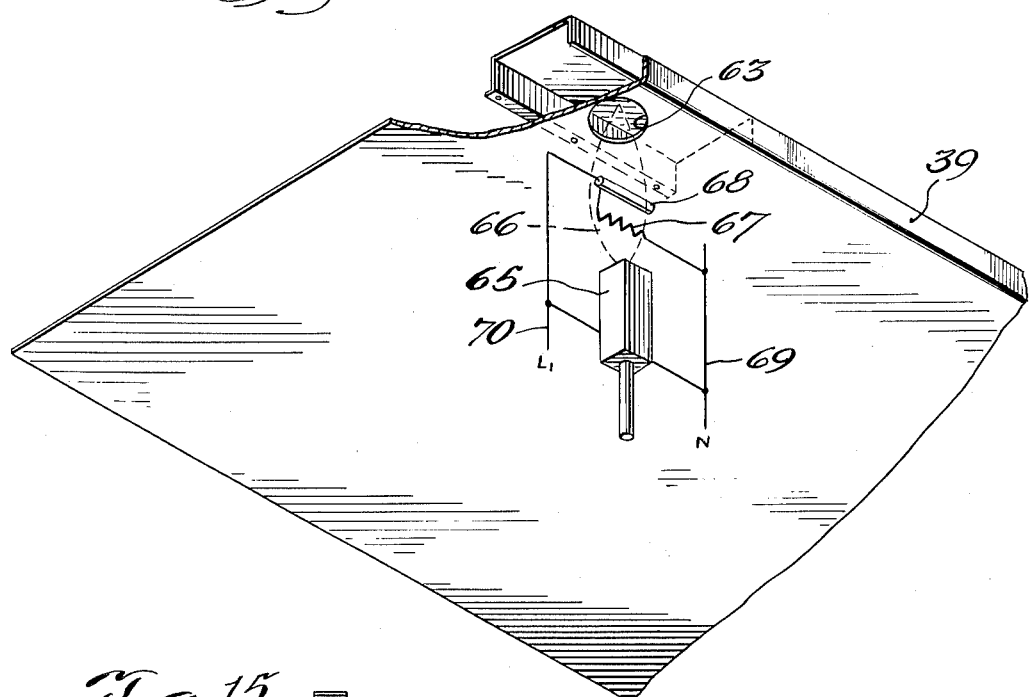
FIGURE 19 is a fragmentary semi-diagrammatic perspective view illustrating one embodiment of a pilot and ignition system for the burners of this invention specifically applied to the embodiment of FIGURE 16.

In the embodiment of FIGURES 1-7 inclusive, the burner 20 is illustrated as located in a gas cooking stove 11 having the usual upper oven 22 and lower broiler 23 each provided with its access doors 24 and 25, respectively, and with vent means illustrated diagrammatically at 26 for conveying heated gases into the oven 22.

The burner 20 of this first embodiment comprises a flat flame extender and deflector metal sheet or plate 27 located adjacent the top of the broiler space 23 and being of generally rectangular shape. This flame extender plate 27 is provided with a transverse embossment 28 in its upper surface at one end to provide a combustible fuel mixture manifold. Against the lower surface 29 of the plate 27 there is provided a spacer plate 30 and beneath this there is provided a cover plate 31. As is shown in FIGURES 3 and 4, the spacer plate 30 is provided with spaced cut-out sections 32, 33, 34 and 35 to provide spaced burner port means in the burner. As is shown in these figures, the ports 33 and 34 are relatively large and are near the center of the burner while the ports 32 and 35 are smaller and are adjacent the ends. The cover plate 31 then cooperates with the spacer plate 30 and the flame extender plate 27 to provide flat fuel mixture ports opening generally toward the opposite end 36 of the burner with the two end ports 32 and 35 also angled toward the sides of the burner.

The combustible fuel mixture is supplied to the burner by means of a conduit 37 which, as shown in FIGURE 7, may be in the form of a mixing tube.

The edges of the flame extender plate 27 of the burner 20 are provided with spaced flue means or openings 38 for the exit of the products of combustion. These also serve to define the extent of the flame. In various applications of this burner principle, openings 38 may not be necessary if the periphery of the burner is not enclosed.

The solid flame extender plate 27 located adjacent to one side of the port (FIGURE 5) isolates one side (the upper side) of the out-flowing stream of gaseous fuel from the secondary air supply. This results in greater elapsed time and travel distance of the fuel mixture before diffusion of sufficient secondary air from below into the flame to complete the combustion of all available fuel mixture. During the combustion the burning mixture is in a thin lamina that is separated from the flame extender plate 27 by a thin lamina of combustible gas and air. The unburning lamina adjacent the extender plate burns upon being supplied with secondary air but in the meantime the air-gas mixture and secondary air is continuously replenished so as to maintain the lamina conditions.

Cooling of the flame ignition zone by contact with extender plate 27, with resultant poor combustion, is prevented by the unreacted and unheated fuel-air mixture progressively flowing out between the flame extender plate 27 and ignition zone of flame envelope. This laminar flow acts to isolate and insulate the plate from the ignition zone. The plate when made of metal also tends to conduct heat from the fuel-air mixture. The length (and breadth) of this combustion zone is thus controlled by the rectangular cross section of the burner port and the amount of gas-air mixture it will pass, the amount of primary air in this supply and the boundary set up by the plate 27 which causes all union with secondary air to occur on one side of the flowing stream of gas mixture. The burner port, as illustrated in FIGURES 1-7, is preferably not more than about $3/32$ inch thick so as to prevent flame projecting back into the port. The port depth may be increased by increasing the velocity of the gaseous fuel mixture issuing from the port as hereinafter explained.

Figure 16:
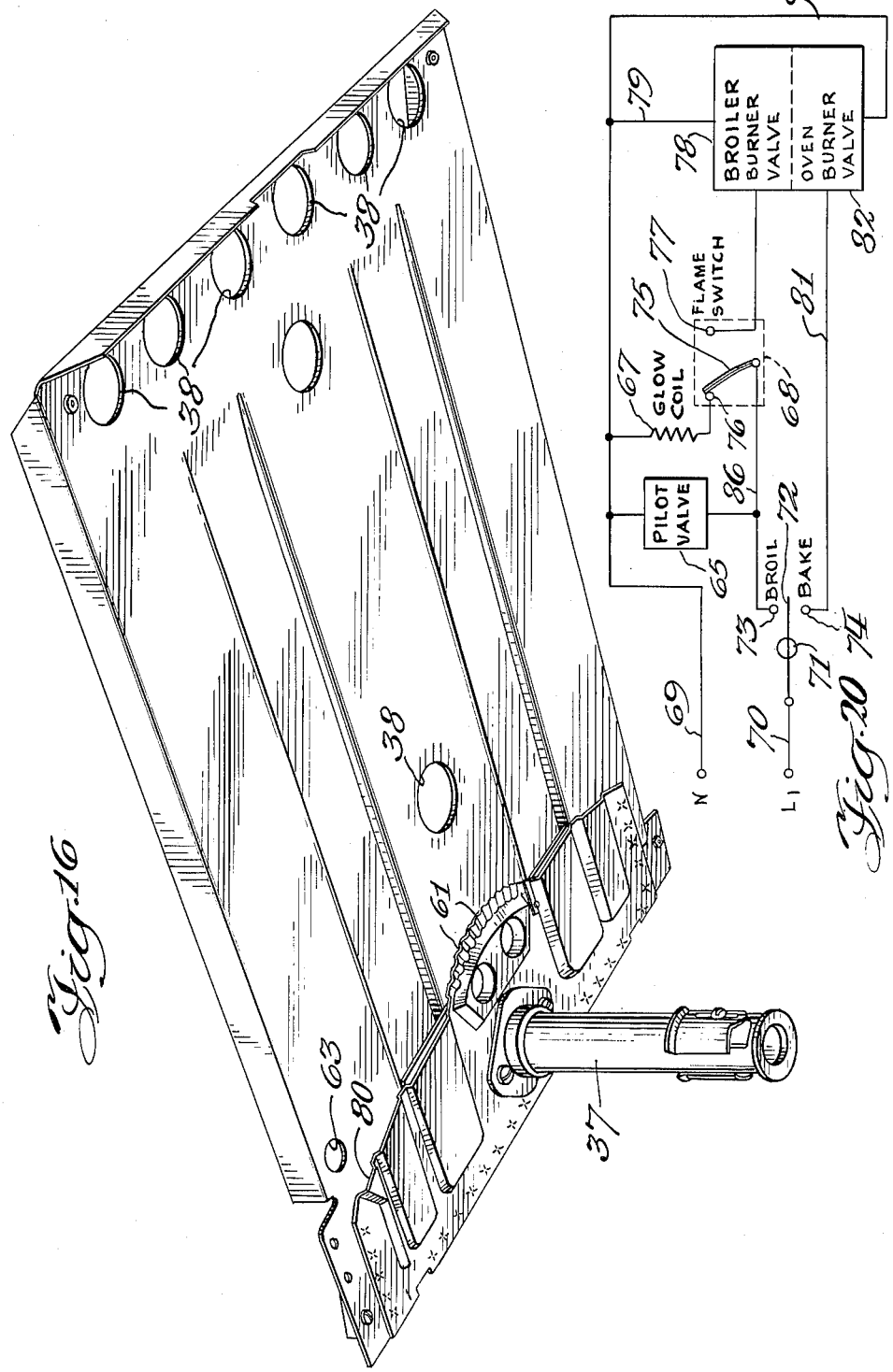
FIGURE 16 is a view similar to FIGURE 7 but showing a fourth embodiment of the burner.

In order to aid in confining the flame to the lower surface 29 the opposite end 36 and the side edges of the flame extender plate 27 are provided with downturned flanges 39. Depending on the particular application, flange 39 may be upturned, as shown in FIGURE 16, or even omitted to obtain the optimum performance. As a further aid to directing the gaseous fuel in flat strips and also to strengthen the flame extender plate 27, there are provided two elongated spaced and substantially parallel upwardly extending embossments 40.

Summarizing the operation of the burner there is a flat stream of primary air-gas mixture issuing from the burner ports 32, 33, 34 and 35 which sweeps the underside of flame extender plate 27 essentially free of secondary air. When the gaseous fuel is ignited, combustion takes place on the surface of the stream of the fuel mixture exposed to the available secondary air, namely surface C, and continues through the zone B-C as shown in FIGURE 5. The plate 27 isolates the other side of the mixture from secondary air. The zone A-B consists of laminar layers of the relatively cool unburned primary air-gas mixture that isolates and insulates the extender plate 27 from the high temperature of the flame zone B-C. As the gases progress to the edges of the extender plate 27, more of the laminar primary air-gas mixture is burned as it comes in contact with the secondary air until outer flame surface C meets the extender boundary line A at the outer edges of extender plate 27.

In the illustrated first embodiment the end pairs of spaced burner ports 32-33 and 34-35 which comprise the individual burners are closely adjacent each other so that flame can spread from one burner port to the next. However, the large inner ports 33 and 34 are spaced from each other a considerable distance. In order to provide for carrying flame between these two larger burner ports a series of small closely adjacent flame carrier port means 41 are provided. These are particularly valuable when a fuel igniter as illustrated at 42 (FIGURE 3) is used. Here, as soon as the igniter ignites the fuel at any area of the gas exit ports this flame is carried immediately to all ports. The carrier port means 41 in this first embodiment are provided by spaced embossments 43 in the cover plate 31. The flame extender plate 27, the spacer plate 30 and the cover plate 31 are all held assembled by spaced screws 44.

As is apparent by the foregoing description of burner 20, the burner consists of an arrangement of individual burners identified as burner ports 32, 33, 34 and 35. Many arrangements of these burner ports or a single port may be used, depending on the size and shape of the area to be heated.

The second burner embodiment of FIGURE 8 is very similar to the first embodiment, except here the elongated parallel embossments 40 are omitted. The burner port openings are defined by cutouts 133 and 134 of the spacer plate in cooperation with the extender plate 127 and the cover plate 131. The flame extender plate 127 is essentially flat.

In the third burner embodiment of FIGURES 9-14 the flame extender plate 327 is provided with an upwardly extending embossment 328 like the embossment 28 to provide a fuel manifold. In addition, this embodiment is provided with three parallel upwardly extending embossments 340 with two being adjacent the sides of the extender plate 27 and the other down the center which extends into manifold 328, thereby providing burner ports 47 of the individual burners.

In this embodiment the cover plate 331 is provided with three embossments 46 juxtaposed to the embossments 340 and cooperating therewith to provide the burner ports 47. As can be seen from FIGURE 12, a port divider plate 45 is positioned in the center of each port 47 and functions to prevent backfiring or flame propagation backwardly into the manifold and the fuel mixture supply. In addition, the flame carrier ports 341 are formed of embossments in the cover plate 331.

In this third embodiment the flame is also projected along the lower surface of the flame extender plate 327 toward the flue openings 338 in the manner previously described in connection with the flue openings 38.

Figure 15:
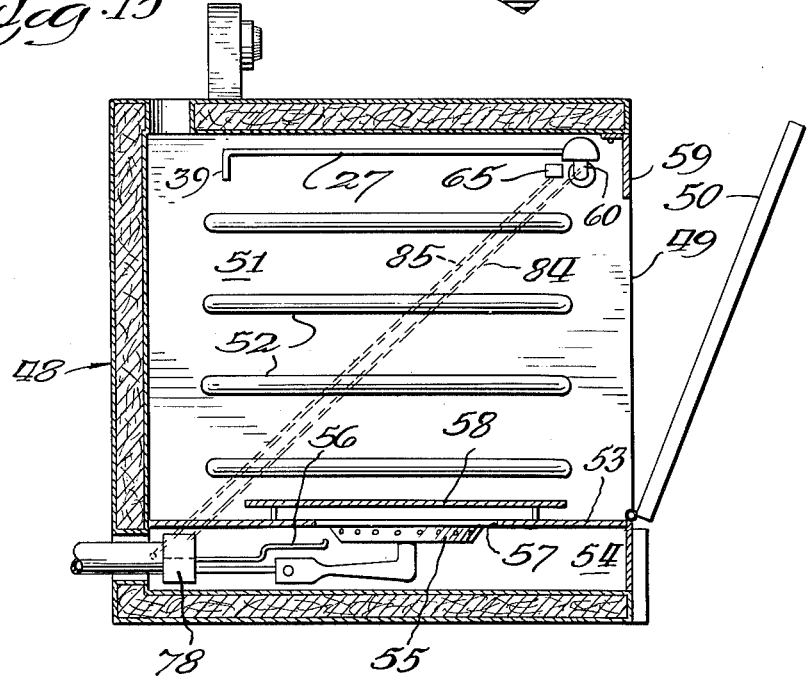
FIGURE 15 is a view similar to FIGURE 1 but showing a second embodiment of a cooking unit.

In the cooking unit embodiment of FIGURE 15 the oven 48 is of the same type and size as used in an electric oven but modified for the gas burner. This oven has an access opening 49 normally closed by a hinged cover 50 with the interior 51 provided with the usual guide racks 52 for supporting shelves (not shown). The bottom of the oven is provided with a floor 53 above a chamber 54 in which is located a conventional gas burner 55 with a standing pilot means 56. The floor 53 is provided with an opening 57 in which is located the burner 55 and above which is located a spaced deflector plate 58.

In the oven 48, at the top thereof, there is provided a front burner mask plate 59. Extending rearwardly of the plate 59 at the top of the interior 51 is a flame extender plate 27, as previously described, including the down-turned flanges 39 of which only the rear flange is shown. At the front of the extender plate 27 there is provided flame projecting means 60, shown for example in FIGURES 5, 6 and 7 as the conduit, manifold and ports, except here the flame is projected rearwardly away from the access opening 49 instead of toward the access opening. This keeps the projected flame away from the door 50 as well as the usual handles and oven knobs and protects the operator of the oven from accidental injury.

FIGURE 16 illustrates a fourth embodiment of the burner. The burner of FIGURE 16 is generally similar to the one in FIGURE 7 except in this fourth embodiment the flame carrier port means 61 are arranged in an arc whose center is substantially at the central axis of the fuel mixture conduit 37 so that the flame carrier port means 61, being arcuately arranged, aids in carrying the flame from one side to the other as the end port means project inflammable mixture toward and into the side flame sheet segments. In this embodiment there is also a fuel-air mixture port 80 to supply the mixture toward the pilot opening 63 and pilot 65 (FIGURE 19).

Figure 17:
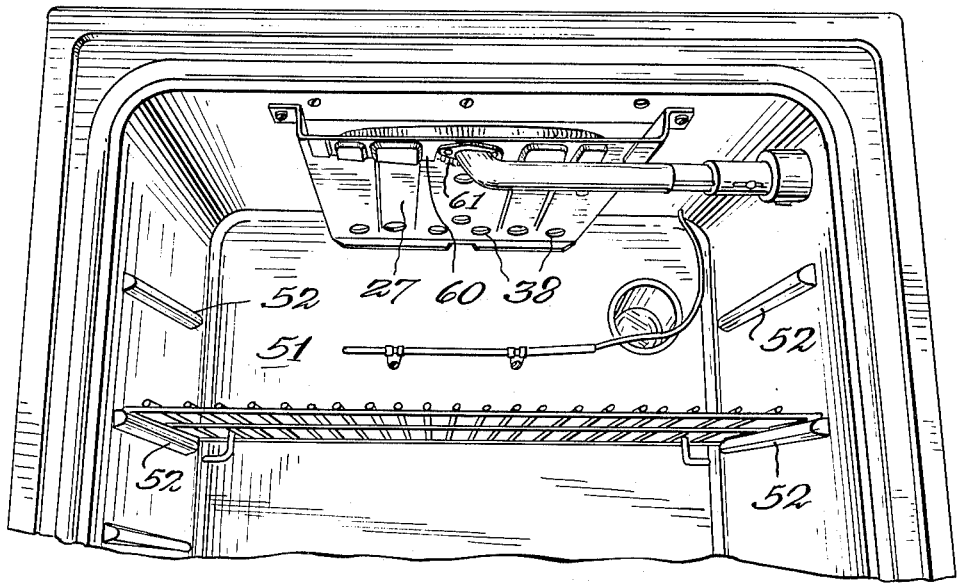
FIGURE 17 is a fragmentary perspective view of a cooking unit similar to that shown in FIGURE 15.

FIGURE 17 is a fragmentary perspective view through the access opening of the oven of a cooking unit with the flame extender plate 27 located at the top of the oven interior 51 and the flame projecting means 60 located at the front of the oven. The gaseous fuel inlet is shown at one side of the oven 51 and it is clearly possible to direct plate 27 transversely of oven 51. In some ovens, such an arrangement of the burner plate 27 might be practical or even necessary.

Figure 18:
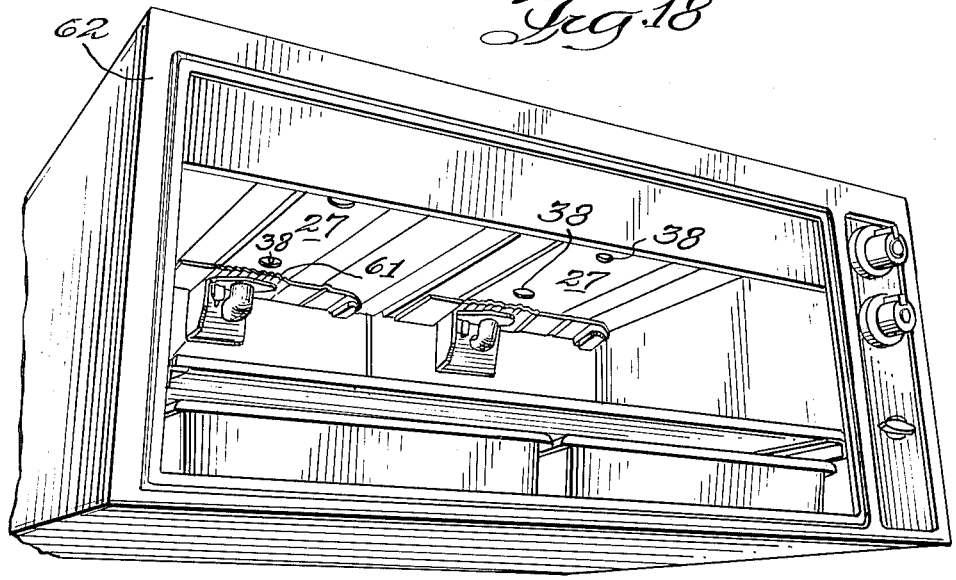
FIGURE 18 is a view similar to FIGURE 17 but illustrating a fourth embodiment of a cooking unit of the invention.

FIGURE 18 illustrates a fourth cooking unit embodiment broiler 62, particularly of a commercial type, in which a plurality of flame extender plates 27 are arranged side-by-side and adjacent the top of the broiler space.

FIGURE 19 illustrates semi-diagrammatically the pilot and ignition system of one embodiment of a burner, specifically the embodiment of FIGURE 16. Here there is provided the flame extender plate 27 and the side flanges 39, of which only one is shown for illustrative purposes, with a pilot opening 63 located in a raised section 64 adjacent one corner of the plate 27. Beneath this opening 63 is a pilot and pilot valve 65 adapted to project a pilot flame indicated at 66 so that the top of the flame enters the opening 63. Section 64 prevents impingement of the pilot flame on the upper wall of interior 51 of the oven. Arranged to be in the flame 66 is a glow coil indicated at 67 for ignition purposes and a flame switch 68 for indicating when the pilot is burning. The glow coil 67 is powered from power source lines marked $L_1$ and N.

The pilot opening is adapted to be located at one side of the burner as shown in the embodiment of FIGURE 16 where the pilot and pilot valve 65 together with the glow coil 67 will be positioned as shown in FIGURE 15 out of the path of the projected sheet of flame but close enough thereto to initiate ignition of the flame sheet. This is a very important advantage as it locates the pilot flame out of the way of the flame sheet so as not to interrupt the continuity of the sheet by impinging thereon.

The preferred wiring diagram for the oven of FIGURE 15 is illustrated in FIGURE 20 where the power line connections are shown at N (line 69) and $L_1$ (line 70).

Connected to line 70 is a control 71 having an arm 72 adapted to engage either the broil contact 73 or the bake contact 74. The broil contact 73 is connected to a line 86 which leads to a bimetal thermostat 75. This thermostat forms a part of a flame switch having one contact 76 leading to the glow coil 67 and another contact 77 leading to an electric broiler burner valve 78. The other side of the broiler valve 78 is connected by a line 79 to the line 69. The electric pilot valve 65 is connected between the lines 69 and 75.

The bake contact 74 is connected by line 81 to an electric oven burner valve 82. The other side of this burner valve is connected by line 83 to the line 69 to complete the circuit.

When the oven as illustrated in FIGURE 15 is to be used for baking the control knob 71 is turned to engage the arms 72 with the contact 74. This energizes the oven valve 82 to supply ignitible mixture to the burner 55 where it is ignited by the standing pilot 56.

When it is desired to use the oven for broiling the knob 71 is turned to engage the arm 72 with the broil contact 73 thereby automatically de-energizing the oven valve 82 and energizing the pilot valve 65, glow coil 67 and flame switch 68. As the bimetal 75 is cold it is in engagement with the contacts 76 to energize the glow coil 67 and ignite the fuel and air mixture now flowing through the pilot valve 65. As soon as the resulting pilot flame 66 (FIGURE 19) that is ignited by the glow coil 67 heats the bimetal 75 it curls over into engagement with the contacts 77 to energize and open the broiler burner valve 78 to supply fuel to the broiler burner. This movement of the bimetal 75 de-energizes the glow coil as it is now no longer needed.

Referring now to FIGURE 15, gaseous fuel and air are supplied to the broiler burner by a conduit 84 from the broiler valve 78. Conduit 85 bypasses valve 78 and supplies gaseous fuel to pilot valve 65.

FIGURE 21 illustrates a test apparatus in which the burner was operated in various angular positions from below the horizontal to the vertical and beyond. In this embodiment there is provided a stand 86 carrying an air-fuel gas manifold 87 and a burner 20 including the burner plate 27. As shown here, the burner was operated from a position A sloped down from the horizontal at all angular positions including the horizontal, vertical and a position B leaning back from the vertical. In all these positions the flame was projected at least initially in the same relative position to the burner plate as illustrated in FIGURE 5.

In the embodiment of FIGURE 22 the burner includes a manifold 88 for the air and gas mixture and a burner plate 89 having the shape of a section of a cylinder. In this embodiment the flame is projected from the burner opening 90 beneath the plate 89 lengthwise thereof. Thus the curvature of the plate 89 is transverse to the direction of flame propagation.

To summarize, the structure and operation of the open flame burner of this invention is as follows: The burner comprises an incombustible surface means (e.g. plate 27) and means (e.g. manifold ports 32–35) for projecting an air-gas mixture (from conduit 37) along the incombustible surface (see FIGURE 5). The means for delivering the air-gas mixture to the incombustible surface are essentially conventional, including conduit means for transferring the gas, which is under pressure, to a conventional mixing tube having Venturi means (e.g. 37 at FIGURE 16) for taking in primary air. From the mixing tube the air-gas mixture is delivered to a manifold (28) communicating with a port means (32–35) preferably defined on one side by the incombustible surface (27) and on the opposite side by means (e.g. cover plate 31) substantially parallel to the incombustible surface. In general, the length or transverse dimension of the port is not critical and may be varied to suit the particular application. The surface means (27) may have a reflecting or non-reflecting surface as desired. While the surface means is preferably heat conducting, such as a metal plate, so as to cool the air-gas mixture and further delay complete combustion so as to produce a larger sheet of flame, it may be desirable to use a non-heat conducting material in certain applications, and such materials are within the scope of this invention.

The velocity of the air-gas mixture issuing from the port, as determined by available pressure and the cross sectional area of the port, must of course be greater than the rate of flame propagation backward toward the port in order to insure against flashback into the manifold. At lower velocities the effective depth of the port may be increased simply by providing a plurality of spaced baffles (e.g. a plurality of plates 45, FIGURE 12) to give in effect a series of stacked ports (e.g. 47) of relatively small depth.

In the combustion process the air-gas mixture is projected along the incombustible surface (FIGURE 5). The air-gas mixture in effect sweeps the surface (of 27) free of air or other ambient gases. Then, when the air-gas mixture is ignited, a combustion zone (B–C, FIGURE 5) is propagated along the outer surface of the air-gas mixture (the surface B) away from the incombustible surface, the incombustible surface acting as a baffle to preclude exposure of the inner surface (the surface A) of the air-gas mixture to secondary air. In cross section the lighted burner appears as a laminar system, the inner layer being the incombustible surface (27) the intermediate layer being air-gas mixture (A–B) and an outer layer (B–C) being the combustion zone.

The incombustible surface member is smooth, preferably straight, and substantially parallel to the direction of flow of the air-gas mixture. The surface need not be planar, but may be, in cross section, arcuate, irregular or even cylindrical providing the cylinder is large enough to provide a source of secondary air through its center (e.g. see FIGURE 22). The surface is smooth, i.e. so that fluids may flow smoothly over it in the direction of flow, to provide a thin layer of the fluid fuel-air mixture adjacent the surface. By "smooth" I mean that the surface produces streamline flow at the air-gas velocities used and does not substantially cause turbulence within the mass of fluid as it passes over the surface. The function of the incombustible surface is to isolate the air-gas mixture on one side from secondary air. In addition, if the surface means is metallic the incombustible surface conducts heat away from the air-gas mixture, thereby cooling the mixture relative to the combustion zone. Both of these functions tend to lengthen the zone in which combustion takes place over the incombustible surface. This is true: (1) because secondary air is necessary in order to complete combustion of the air-gas mixture, and the air-gas mixture will travel a distance along the surface means before the required amount of secondary air can unite with the air-gas mixture, and (2) because the air-gas mixture must reach a combustion temperature before combustion will take place even though the required amount of secondary air is present.

In addition to the combustion zone lengthening functions performed by the incombustible surface means (e.g. plate 27), the flame or combustion zone may be lengthened by increasing the velocity of the air-gas mixture from the ports (e.g. 32–35). The linear rate of flame propagation within a pass of air-gas mixture is essentially constant and therefore if a mass of air-gas mixture itself is moving at a given velocity it is obvious that the body of the air-gas mixture will travel a given distance before being completely consumed. If the velocity of the mass is then increased, the distance it travels will increase, since the time required for complete combustion remains constant.

The velocity of the air-gas mixture is important for another reason. The mass of air-gas mixture leaving the port has a given velocity which tends to keep the mass moving in its initial direction due to inertia. This is important, for instance, when it is desired to use the burner (20) in an inverted position (as approaching a left horizontal position in FIGURE 21). In the inverted position the air-gas mixture which is normally lighter than air will have a tendency to lift off the surface, thereby obviating the air isolating effect of the incombustible surface. But if the velocity of the air-gas mixture is great enough the mass of the mixture will be projected along the incombustible surface a substantial distance before it lifts off and the surface will act to isolate the air-gas mixture on one side from secondary air in the manner explained above. Again, the object is to lengthen the path through which the air-gas mixture travels before complete combustion takes place.

As can be seen from the above description, the burner of this invention projects the flame in a long, wide and flat sheet. This results in more even heating which is particularly useful in broiling as well as in radiant heating generally.

Although the burner of this invention has been illustrated in connection with a broiler, it is obvious that it can be used for other heating applications whether industrial or household. Furthermore, where the heat demands are extremely large a series of burners may be placed side-by-side, as shown in FIGURE 20, to provide spaced flat sheets of flame that heat in conjunction with each other.

Having described my invention as related to the embodiments shown in the accompanying drawings, it is my intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. A surface radiant burner apparatus, comprising: an elongated primary air-gas mixing chamber; conduit means for supplying said mixing chamber with a combustible primary air-gas mixture; a flame extender member positioned immediately superjacent said mixing chamber and projecting outwardly therefrom in a plane that is other than vertical to a terminal end edge remote from said chamber; primary air-gas port means connected to and communicating with said mixing chamber and extending laterally thereof for projecting a sheet of primary air-gas mixture toward said terminal end edge immediately beneath said flame extender member in contiguous relationship therewith to sweep a substantial portion of said flame extender member free of ambient secondary air to thereby provide a flat, extensive layer of flame exposed substantially entirely on its lower surface to secondary air beneath said flame extender member upon ignition of said primary air-gas mixture; and means adjacent said terminal edge of said extender member for confining said flame layer to said extender member, said means for confining comprising a downturned flange.

2. In a cooking unit having an oven and a broiler therebeneath, a fuel burner in said broiler, comprising: an elongated primary air-gas mixing chamber adjacent the top of said broiler; conduit means for supplying said mixing chamber with a combustible primary air-gas mixture; a flame extender member positioned immediately superjacent said mixing chamber and projecting outwardly therefrom in a plane that is other than vertical to a terminal end edge remote from said chamber; primary air-gas port means connected to and communicating with said mixing chamber and extending laterally thereof for projecting a sheet of primary air-gas mixture toward said terminal end edge immediately beneath said flame extender member in contiguous relationship therewith to sweep a substantial portion of said flame extender member free of ambient secondary air to thereby provide a flat, extensive layer of flame exposed substantially entirely on its lower surface to secondary air beneath said flame extender member upon ignition of said primary air-gas mixture, said primary air-gas port means including means providing a plurality of spaced, parallel orifices for projecting a generally rectangular sheet of flame beneath said flame extender member; means adjacent said terminal edge of said extender member for confining said flame layer to said extender member, said means for confining comprising a downturned flange; and means providing spaced vents in said flame extender member for exhausting flue gases from beneath said flame extender member in a direction upwardly toward said broiler top, a plurality of said vents being located adjacent said terminal end edge and flange and spaced therealong.

3. A fuel burner, comprising: elongated substantially flat flame extender means having a pair of opposite ends and an essentially smooth surface; passage means for a gaseous fuel mixture; spaced port means adjacent one of said ends communicating with said passage means having exits subjacent said surface opening toward the other of said ends for projecting flat flame segments of an over-all flame sheet adjacent said surface toward said other of said ends, said smooth surface producing substantially laminar flow of said mixture along said surface; and means forming spaced elongated embossments in said surface each having its open side adjacent said surface and extending from adjacent said port means toward said other of said ends to direct said fuel mixture toward said other of said ends by way of said embossments.

4. A fuel burner, comprising: an incombustible member having a pair of opposite ends and a surface means for inducing substantially laminar fluid flow therealong; means cooperating with said incombustible member for defining a gaseous fuel port means positioned beneath said surface means adjacent one of said opposite ends and opening toward the other of said opposite ends to project said fuel toward said other end substantially parallel to and contiguous with said surface; means for delivering fuel under superatmospheric pressure to said port means; and means forming spaced elongated embossments in said surface means each having its open side adjacent said surface means and extending from adjacent said fuel port means toward said other of said ends to project said fuel toward said other of said ends by way of said embossments.

5. A fuel burner, comprising: flame extender means including means providing an essentially flat bottom surface; passage means in said burner for a gaseous fuel; spaced port means communicating with said passage means having exits subjacent said surface for projecting flat flame segments of an over-all flame sheet subjacent said surface, the edges of said extender means substantially defining the lateral limits of said flame sheet; spaced carrier port means in said burner between adjacent spaced port means to an adjacent port means; and exit flue means for escape of combustion products in said extender means adjacent to but outwardly of said carrier port means.

References Cited by the Examiner

UNITED STATES PATENTS

| | | | |
|---|---|---|---|
| 2,601,299 | 6/1952 | Kennedy | 126—41 X |
| 2,794,497 | 6/1957 | Dufault et al. | 126—41 X |
| 2,812,806 | 11/1957 | Morrison | 158—125 X |
| 2,875,820 | 3/1959 | Nesbitt | 158—115 |
| 3,033,463 | 5/1962 | Doner et al. | 126—39 |
| 3,146,693 | 9/1964 | Di Pietro | 158—113 X |

FOREIGN PATENTS

| | | |
|---|---|---|
| 771,705 | 7/1934 | France. |
| 173,593 | 12/1921 | Great Britain. |
| 570,022 | 12/1957 | Italy. |
| 182,332 | 6/1936 | Switzerland. |

FREDERICK L. MATTESON, Jr., *Primary Examiner.*

JAMES W. WESTHAVER, *Examiner.*

C. J. MYHRE, *Assistant Examiner.*